United States Patent
Küking

(10) Patent No.: US 8,910,594 B2
(45) Date of Patent: Dec. 16, 2014

(54) POULTRY CAGE HAVING LITTER PLATE

(75) Inventor: Jörg Küking, Hopsten (DE)

(73) Assignee: Big Dutchman International GmbH, Vechta (DE)

( * ) Notice: Subject to any disclaimer, the term of this patent is extended or adjusted under 35 U.S.C. 154(b) by 43 days.

(21) Appl. No.: 13/518,786

(22) PCT Filed: Dec. 8, 2010

(86) PCT No.: PCT/EP2010/069158
§ 371 (c)(1),
(2), (4) Date: Sep. 14, 2012

(87) PCT Pub. No.: WO2011/076568
PCT Pub. Date: Jun. 30, 2011

(65) Prior Publication Data
US 2013/0014704 A1    Jan. 17, 2013

(30) Foreign Application Priority Data

Dec. 23, 2009    (DE) ...................... 20 2009 017 565 U

(51) Int. Cl.
*A01K 31/04*    (2006.01)
*A01K 31/00*    (2006.01)

(52) U.S. Cl.
CPC .................................. *A01K 31/007* (2013.01)
USPC ............................ 119/443; 119/479; 119/480

(58) Field of Classification Search
CPC ......... A01K 31/06; A01K 31/04; A01K 1/03; A01K 1/031; A01K 31/22; A01K 31/18; A01K 31/002
USPC ......... 119/428, 429, 432, 436, 437, 442, 443, 119/452, 455, 458, 459, 462, 463, 479, 480, 119/482, 487, 490
See application file for complete search history.

(56) References Cited

U.S. PATENT DOCUMENTS 1,973,530 A * 9/1934 Hart ............................... 119/478
3,465,722 A * 9/1969 Duff .............................. 119/456
(Continued)

FOREIGN PATENT DOCUMENTS

CH             405684      1/1966
DE        202007001531    4/2007
(Continued)

OTHER PUBLICATIONS

International Search Report, PCT/EP2010/069158, Jun. 22, 2011.

*Primary Examiner* — Trinh Nguyen
(74) *Attorney, Agent, or Firm* — Price Heneveld LLP

(57) ABSTRACT

The invention relates to a poultry cage comprising: a cage floor (10), preferably having a grid structure, end (11, 13) and side walls (12, 14) which extend upward from the cage floor and define all sides of an area where the animals are kept, an introducing device (50) for introducing litter material (51), which is disposed above the cage floor and from which the litter material can be dispensed from at least one discharge opening, wherein at least one section of the device for introducing litter is disposed between the side walls, a litter plate (60, 160) connected to the cage floor, which has an upwardly facing floor standing area, comprising one section (66) which lies above the at least one discharge opening and has fixing means for fixing the litter plate to the cage floor. According to the invention, the floor standing area has at least one abrasive surface section (62), the roughness of which serves to shorten the claws of the poultry walking thereon and to blunt the beaks of the poultry picking thereon.

18 Claims, 5 Drawing Sheets

(56) References Cited

U.S. PATENT DOCUMENTS

Figure 1:
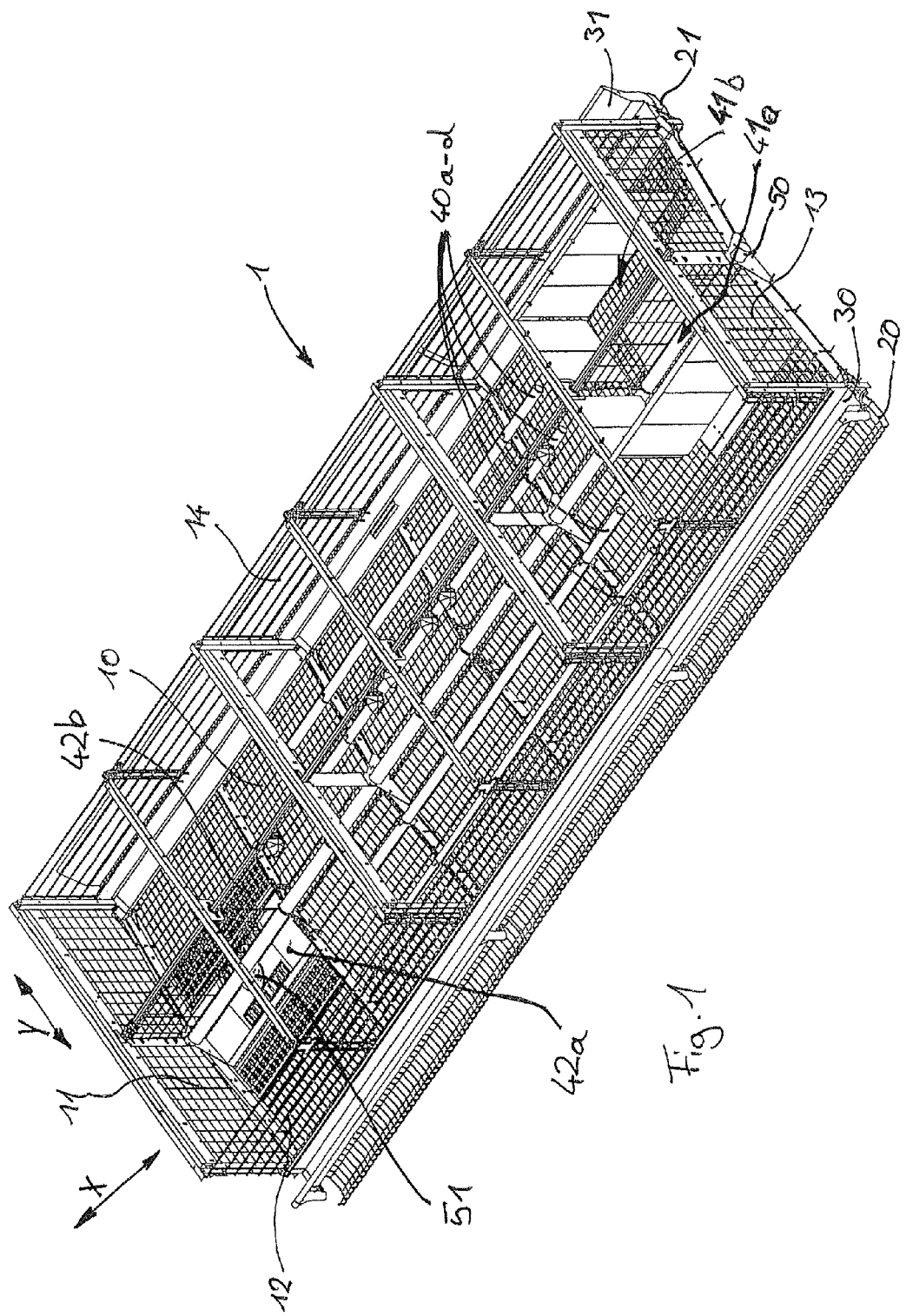

| | | | | |
|---|---|---|---|---|
| 3,478,721 A | * | 11/1969 | Maxfield | 119/478 |
| 3,635,197 A | * | 1/1972 | Van Huis | 119/478 |
| 3,777,710 A | * | 12/1973 | Rhinehart | 119/454 |
| 3,903,851 A | * | 9/1975 | Van Huis | 119/478 |
| 3,994,260 A | | 11/1976 | Fleshman | |
| 4,020,793 A | * | 5/1977 | Morrison | 119/479 |
| 4,315,481 A | * | 2/1982 | Coile et al. | 119/437 |
| 4,697,547 A | * | 10/1987 | Malestein | 119/457 |
| 4,869,206 A | * | 9/1989 | Spina | 119/417 |
| 6,467,432 B1 | * | 10/2002 | Lewis et al. | 119/442 |
| 2007/0277745 A1 | * | 12/2007 | Clemmons et al. | 119/455 |

FOREIGN PATENT DOCUMENTS

| | | |
|---|---|---|
| EP | 1149528 | 10/2001 |
| EP | 1308088 | 10/2003 |

* cited by examiner

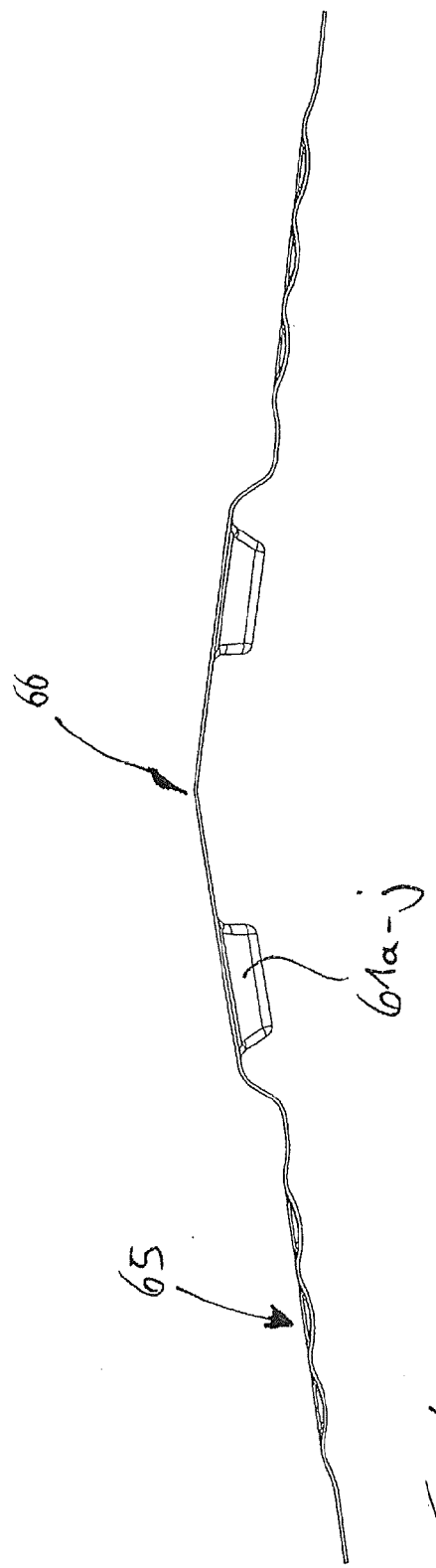

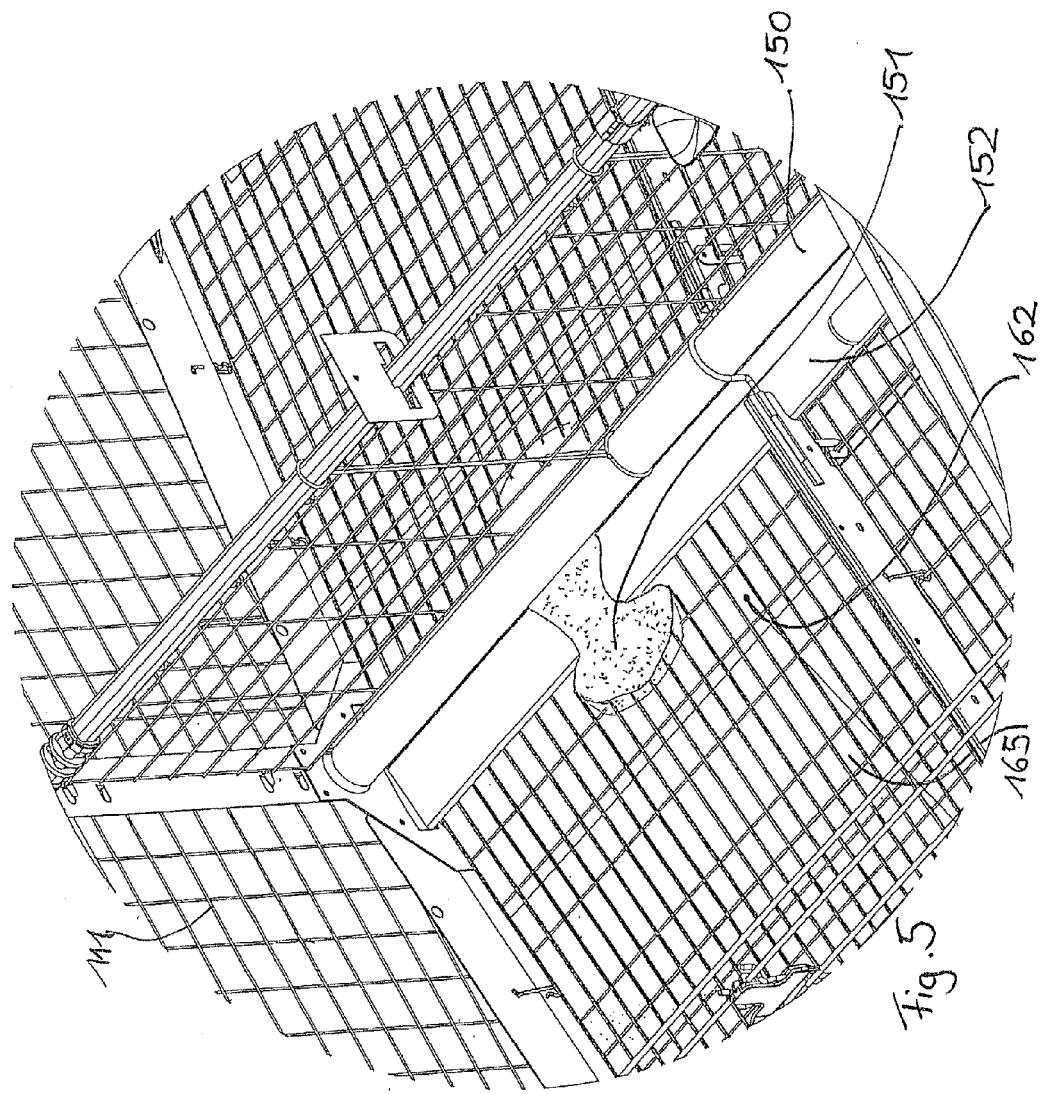

POULTRY CAGE HAVING LITTER PLATE

The invention relates to a poultry case comprising a cage floor, preferably having a grid structure, end and side walls which extend upward from the cage floor and define all sides of an area where the animals are kept, an introducing device for introducing litter material, which is disposed above the cage floor and from which the litter material can be dispensed from at least one discharge opening and preferably from a plurality of discharge openings, wherein at least one section of the device for introducing litter is disposed between the side walls, a litter plate connected to the cage floor, which has an upwardly facing floor standing area, comprising one section which lies above the at least one discharge opening and has fixing means for fixing the litter plate to the cage floor. The invention also relates to a litter plate for such a poultry cage and to a method for producing such a litter plate.

Poultry cage of the aforementioned kind are specifically used for keeping laying hens. In order to allow species-appropriate keeping of the animals, consideration must be given to their needs when designing such poultry cages. In a number of countries, minimum requirements for such poultry cages are stipulated by statutory norms, such as Council Directive 1999/74/EC of 19 Jun. 1999 laying down minimum standards for the protection of laying hens in the European region, or the Tierschutz-Nutztierhaltungsverordnung (Animal Protection Regulations for the Keeping of Livestock—TierschNutztV) of 2006, which has effect for Germany.

Typical requirements for species-appropriate keeping of animals in poultry cages of the kind initially specified include providing a specific area per hen, a specific minimum total area and minimum total height of the poultry cage for the group of hens kept therein, the provision of species-appropriate structural elements, such as a nest box, perches and an area in which the animal are able to pick and scratch in a litter material in a species-typical manner. In the poultry cage, this litter or scratching area must be provided with a are that can be used by the majority of the animal in the poultry cage, so that several animals can pick and scratch simultaneously.

The littered area must be designed in a functionally appropriate manner with regard to several requirements. Firstly, steps must be taken to ensure that litter material which is brought into the littered area is not distributed by the laying hens within a very short time in such a way that it escapes from the littered area. This would lead to the laying hens being neither animated to pick nor able to scratch. Secondly, the littered area must be designed in such a way that it can be cleanly simply and reliably of dirt, in particular of droppings, in order to satisfy hygiene requirements.

Another requirement to be met for species-appropriate keeping of laying hens in poultry cages is that the claws should wear away as a result of the activity of the laying hens inside the poultry cage, in such a way that they keep to a length that is typical of the species, thus preventing the claws from becoming too long. This is an important requirement, especially when several laying hens are kept in a shared poultry cage (i.e., in an "enriched cage" or in a "small group" layer management system). This is because when poultry are kept in such small flocks, conflicts over pecking order naturally occurs among the laying hens, which can result in injuries when the claws of the animals are too long.

Arranging flat stone slabs, or fabrics with a rough surface, or metal plates with close-meshed perforations along the side walls of the poultry cage in such a way that these form an inclined support surface for the laying hens are known techniques for claw shortening. The laying hens normally move towards these side walls because there they can access a feeding trough and/or a drinking trough disposed outside the poultry cage. In doing so, the laying hens step on the rough surface, for example on the stone slab. As a result of the animals slipping on the surface, the claws wear down and the desired purpose is achieved. However, one disadvantage of this arrangement is the complex design of the anchoring for the stone slabs in the cage. Furthermore, the entire side wall region fitted with feeding troughs would have to be fitted with stone slabs if the claws of all the animals are to be treated uniformly and completely, which would involve a high level of costs.

The object of the invention is to provide a poultry cage that meets the requirements of laying hens and is less expensive to produce than prior art poultry cages. Another object of the invention is to design a poultry cage which is based more closely on species-appropriate behavior.

These objects are achieved, according to the invention, in the floor standing area having at least one abrasive surface section, the roughness of which serves to shorten the claws of the poultry walking thereon and to blunt the beaks of the poultry picking thereon.

The invention is based on an enriched cage or on a poultry cage suitable for "small group" husbandry. Such poultry cages typically have a floor grid structure over most of the cage floor that is favorable for hygiene purposes. In such poultry cages, there is also a nest box which generally has a solid continuous or mostly continuous floor surface and which is darkened by side walls. There is also a scratch surface onto which litter material is put. Litter material is understood here to include dried fodder as well. Such poultry cages are usually designed with a geometrical structure in which a rectangular floor area is bounded by side walls and end walls. Feeding and drinking mechanisms are typically arranged in the region of the side walls, and an introducing device for litter runs through the poultry cage parallel to and between the side walls. In many cases, this introducing device runs exactly through the middle of the poultry cage. Poultry cages of this construction may be arranged in a long row by placing them end to end. In this case, the introducing device which runs through the poultry cage and the feeding and drinking mechanisms that typically run along the side walls, typically outside the poultry cage, can extend over several such poultry cages arranged in a row.

Disposing a litter plate, on which the litter material introduced by the introducing device is captured and on which the animals can scratch and pick, in the poultry cage underneath the introducing device is known from the prior art. For this purpose, such litter plates generally have a geometrical structure, which may consist, for example, of upwardly projecting fingers, nubs or the like, or in the form of pockets, hollows or the like, in order to keep the litter material on the litter plate for a longer duration, despite the animals scratching, and at the same time to allow the litter plate to be cleaned.

According to the invention, this prior art design of the litter plate is departed from in at least on surface section, and an abrasive surface is provided on the litter plate. An abrasive surface is understood here to be a surface having such a roughness that whenever the laying hens move on said surface, their claws are worn down, and that this effect is also maintained, i.e., is not lost due to the surface wearing down. Such an abrasive roughness of the surface can be achieved, for example, with a surface that has a regularly or irregularly cutting effect. More specifically, the surface may be provided with a plurality of geometrically defined or undefined cutting edges, such as those known, for example, in the field of filing tools with defined or undefined cutting edges and in particular in the field of abrasives. An abrasive roughness approximately equivalent to the structure of an abrasive paper with medium to fine granulation, for example, is suitable for this purpose.

One advantage achieved with the invention is that the apparatus required for claw wear is disposed in the region of the litter, so the natural scratching behavior of the animals is utilized to treat and to wear down the claws in accordance with the principles of species-appropriate husbandry. Another invention that is likewise achieved with the invention is that the abrasive surface also prevents the litter material from being removed too quickly from the litter plate by scratching activity. This can obviate the need for any additional measures aimed at keeping the litter material on the litter plate, such as pockets or hollows or the like, or can at least reduce the scale and number of such additional measures.

It has been found that another beneficial effect of the inventive design of the poultry cage is that, as a result of the animals picking on the litter plate in the region which has an abrasive surface section, the beaks of the laying hens are also blunted. This likewise results in a form of husbandry that is beneficial for animal health as well as species-appropriate, since the undesirable consequences of aggressive picking against other hens and of frequent feather picking can be mitigated in this way. It should be understood that the abrasive surface section may extend across the entire surface of the litter plate, or may occupy only a sub-area of that surface. More particularly, the surface of the litter plate may be provided with hollows, pockets or the like, in which the litter material collects and is held back from being quickly scratched out, and the abrasive surface section is provided only inside these hollows, pockets or other geometrical structures.

It is preferred, as a basic principle, that the entire surface of the litter plate, but at least a large part of the surface and preferably also of the abrasive surface section, is inclined, and designed such that eggs laid on it can roll off in such a way that they can roll out of the litter plate region and toward an egg collection belt.

According to a first preferred embodiment, the at least one abrasive surface section extends as far as a region situated above the at least one discharge opening. In this embodiment, the litter material dispensed by the introducing device is dispensed via one or a plurality of discharge openings directly onto the abrasive surface section, i.e., it does not slide over any smooth surface section of the litter plate first, before landing in the abrasive surface section. By disposing the abrasive surface section immediately underneath the at least one discharge opening, the litter material is kept underneath this discharge opening and is therefore able to increase in volume when litter material is continuously discharged from the discharge opening. This is functionally necessary whenever litter material is to be dispensed through an longitudinally extending introducing device from a plurality of openings distributed along the direction of extension, because the litter material typically distributes itself inside the introducing device along the direction of extension of the latter when the litter material in introduced in this manner, and discharge openings lying in this direction of extension are fed successively. In certain embodiments, it is necessary that a discharge opening which lies upstream in this direction of distribution from another discharge opening be closed initially before the downstream discharge opening is fed with litter material. This closure can be achieved by the litter material building up on the abrasive surface section, by building up a cone of litter material that reaches and closes the discharge openings when it acquires a certain height.

It is further preferred that the at least one abrasive surface section is formed by a plurality of abrasive grains which are partially or completely embedded in a binding material. This embodiment allows the litter plate to be produced less expensively. Suitable abrasive grains include grains which have an approximately uniform length:width:height ratio, and grains are also used which preferably have a grain size in a range between 80 µm and 600 µm, in particular about 200 µm. Grains of corundum, in particular, may be used, or grains of some other inorganic abrasion-resistant material.

It is still further preferred that the litter plate is made of a polymer material in which, in the at least one surface section, a plurality of abrasive grains is partially or completely embedded directly in the polymer material or in a cured binding agent. According to this embodiment, the litter plate is made of a polymer material with favorable properties in respect of hygiene and production engineering. In order to form the abrasive surface section, grains of a material different from this polymer material may be joined to the litter plate in such a way that they are disposed in a surface region thereof. This may be done in such a way that the grains are completely embedded in the in the polymer material, i.e., are completely surrounded by polymer material and therefore merely produce a rough surface of the polymer material, or such that the grains are only partially embedded in the polymer material and therefore protrude from the surface of the polymer material, as a result of which an abrasive surface is formed directly by the grains themselves. As an alternative, the abrasive grains may be partially or completely integrated in a binding agent that differs from the polymer material, and said binding agent is applied, in turn, to the litter plate made of polymer material and bonded to the latter. A suitable such binding agent is, for example, a resin such as epoxy resin or the like, which is suitable for binding abrasive grains in a mechanically and adhesively reliable manner. It should basically be understood with regard to this embodiment that the litter plate as a whole may also be made of such a resin, if necessary with fiber reinforcement, for example as a GRP plate, and that the abrasive grains are bonded to the entire surface or to sections thereof. Alternatively, the litter plate may be formed by a mechanical base support made of an inexpensive polymer, such as polyethylene or polypropylene, onto which a thin layer of some other polymer material serving as a binding agent is applied, in which the abrasive grains are embedded.

It is further preferred that the litter plate comprises a plurality of feed/litter pockets in the form of troughs, which are preferably designed as a row or as several parallel rows of adjacent troughs. As explained in the foregoing, these hollows or pockets may be situated in the region of the abrasive surface section or may exclusively form said abrasive surface section or may be disposed outside that region. The hollows or pockets serve additionally to keep the feed/litter material on the litter plate and to prevent fast removal of the litter material from the litter plate.

It is still further preferred that the at least one abrasive surface section of the floor standing area has a roughness within a first roughness range and the floor standing area has at least one second surface section having a roughness within a second roughness range and with a coarser surface structure than the first roughness range. With this embodiment, a design is proposed which has a favorable abrasive effect in the first region for claw wear and for blunting beaks, and which also provide good stability in the second roughness region for the animals walking thereon. It should be understood in this regard that the second roughness region, in particular, may also be formed by regular geometrical structures, such as webs, groove sections or the like. It is particularly preferred that the at least one second surface section is formed by geometrical structuration, in particular by a plurality of hollows or bumps in the floor standing area of the litter plate.

It is also preferred that the litter plate be arranged at a slant in such a way that eggs laid thereon roll away from the litter plate in the direction of a side wall and that the surface structure is preferably designed in such a way that an egg laid on the litter plate is not held anywhere on the litter plate by a structure running transversely or at an angle in relation to the rolling direction toward the side wall. This embodiment ensures that mislaid eggs, that is to say eggs that were not laid in the nest box, can roll from the litter plate. It should be understood in this regard that such rolling cannot be achieved with an arbitrarily large angle of inclination, as in such a case the eggs rolling off would gain too much speed and could be damaged as a result. Instead, a moderate inclination of between 1 and 20 degrees is typically practicable. Such a moderate inclination requires that the litter plate has an appropriate surface geometry. It should be understood in this regard that any undesired holding of an egg, or even undesired stopping of a rolling egg on the litter plate can be prevented by various measures relating to its geometry. It is possible that only structures which extend in the desired rolling direction are present. In many egg laying situations, this can prevent the eggs from being held. However, due to the non-spherical shape of eggs, it is also possible with such a structure that runs in the rolling direction to stop an egg from rolling, if the egg is prevented from aligning itself with its longitudinal axis perpendicular to the rolling direction and then rolling off. An egg fixed in such a way, with its longitudinal axis fixedly oriented in the rolling direction, i.e. perpendicular to the side wall, will not be able to roll even at inclinations of up to 20 degrees. It is therefore preferred that structures be provided that also extend in the rolling direction, but only up to such a maximum height and up to such a maximum spacing that a laid egg cannot be fixed in such an orientation.

According to the invention, hollows, wells and the like are provided in the litter plate to hold back the litter material. Such hollows and wells have wall structures that naturally run transversely or at an angle to the desired rolling direction of the eggs. These wall structures are potentially suitable for holding a laid egg or to stop an egg from rolling. It is therefore envisaged that such hollows, pockets, wells and the like are designed with such a width that an egg can fall with its circumference into the hollow, pocket or well only to such an extent that it is neither fixed in its orientation nor held by a wall structure of the hollow, pocket or well that runs transversely to the rolling direction. Width is understood here to mean the dimension transverse to the desired rolling direction, in other words the dimension parallel to the side wall. More specifically, the width of such hollows, pockets, wells or the like may be approximately equal to the grid spacing of the cage floor in the same direction, but the width should be no greater at the least than said grid spacing. Grid spacing is understood in this context to be the distance between two adjacent parallel grid bars. An egg preferably penetrates only with less than 10% of its volume or with less than 10% of its smallest diameter into the hollow, pocket or well. This can generally and reliably prevent any egg from becoming fixed in its orientation. It should be understood as a basic principle that the aforementioned embodiments and geometries are adapted to the size of the eggs. For example, in poultry cages in which poultry that lay small eggs are kept, a smaller maximum width of a hollow, pocket or well must be provided. In typical chicken husbandry, the commonest form of poultry husbandry, a width of 1.5-2.5 cm is basically ideal for ensuring that eggs roll off with the desired slowness.

According to another preferred embodiment, the litter plate extends on both sides, starting from the section situated below the at least one discharge opening, toward each of the two side walls and that the abrasive surface section(s) is/are disposed in such a way that it/they is/are provided on both sides of the introducing device. It should be understood as a basic principle that the litter plate according to the invention may be designed in such a way that it extends only in the direction of one side wall away from the introducing device, starting from a section that is disposed underneath a discharge opening of the introducing device. In that case, the section of the litter plate disposed underneath the discharge opening is disposed in the region of a side edge of the litter plate, and the abrasive portion may also be disposed in the region of said side edge of the litter plate. From such a litter plate, it is then possible to design a scratching and picking area which is disposed on only one side of the poultry cage, in relation to the line defined by the introducing device. As a basic principle, it is then possible with two such litter plates to obtain a design which is also symmetrical (in the form of point symmetry or line symmetry) in relation to the line defined by the introducing device, and in this way to provide two scratching and picking areas on either side of the introducing device. However, in order to simplify this twin-sided design with regard to both production and also assembly, and to achieve a higher level of safety against litter material falling undesirably between two such litter plates, it is particularly preferred that the litter plate be provided with sections extending on both sides in the direction of the two side walls, and with abrasive surfaces, so that two scratching areas provided in the poultry cage with a single integral litter plate.

It is further preferred that the introducing device is a conveyor pipe with a rotating conveyor mechanism disposed therein, that the conveyor pipe runs from one end face to the other end face through the area where the animals are kept and has at least one radial opening for dispensing feed/litter material. With such an introducing device, litter material is efficiently introduced, thus permitting litter material to be distributed by means of the introducing device to every poultry cage in a row of poultry cages. When the cages are arranged end to end, the introducing device can be embodied as a continuous conveyor pipe which is used to introduce litter material into all the poultry cages in the row through appropriately designed discharge openings.

According to yet another preferred embodiment, the litter plate is disposed underneath the cage floor. It should be understood, as a basic principle, that the litter plate may be disposed above the cage floor of the poultry cage and hence that it comprises the entire floor standing area in this part of its arrangement. This arrangement above the cage floor has the advantage that the surface structure in the region of the litter plate can be freely designed and optimally adapted to the needs of the animals. In one alternative embodiment, it is also preferable in certain applications to dispose the litter plate underneath the cage floor. In such a case, it is preferred that the litter plate be disposed in such a way that it is situated immediately below the cage floor, i.e., in such a way that the upwardly facing surface of the litter plate is in contact at least in sections with the underside of the grid bars forming the cage floor, or is at a very small distance from them. This embodiment makes use of the fact that, even when such an arrangement underneath the cage floor is chosen, the upwardly facing surface of the litter plate can be used at least partially as a floor standing area, since the claws of the animals and the beaks of the animals come into contact with the litter plate through the grid structure of the cage floor during scratching and picking, and the desired abrasive effect of an abrasive portion of the litter plate on the claws and beaks is also achieved as a result.

Another advantage of disposing the litter plate underneath the cage floor is that the grid structure of the cage floor comes to lie above the litter plate. As a result, laid eggs which come to rest in this area can roll in a favorable and gentle manner towards an egg collecting device, as would also occur in other areas of the cage floor. For these reasons, the litter plate is not provided with any additional functions with regard to such laid eggs rolling away. With this embodiment, it is also possible and preferable to dispense with additional functions such as hollows or pockets for retaining the litter material and likewise preferably to dispense with surface structurations that increase the stability of the animals standing on the litter plate. In this preferred embodiment, these two functions can be assumed by the arrangement of grid bars in the cage floor. Designing the arrangement of the litter plate underneath the cage floor is therefore suitable, in particular, for a litter plate which can be produced cost-efficiently and which is solely characterized in that it has an abrasive region over its entire surface or in sections thereof, but otherwise does not need to have any specific structural features.

Another aspect of the invention relates to a litter plate which has an upwardly facing floor standing area and fixing means for fixing the litter plate to the cage floor, in which the floor standing area has at least one abrasive surface section, the roughness of which serves to shorten the claws of the poultry walking thereon and to blunt the beaks of the poultry picking thereon.

With regard to the properties of the abrasive portion, the above descriptions of the poultry cage may be applied in their entirety to the poultry cage having a respectively embodied litter plate and reference thereto is hereby made. It should be understood as a basic principle with regard to the litter plate that the floor standing area must face upwards when installed, and that the abrasive surface section is disposed on said upwardly facing area. It should also be understood that the fixing means may be the kind of fixing means that are suitable for disposing and fixing the litter plate on, i.e., above the cage floor, otherwise the fixing means may also be designed to dispose and fix the litter plate underneath the cage floor. In this regard, it is essential that the fixing means be designed to form a positive engagement with the grid bars of the cage floor. The fixing means may be designed to allow the litter plate to be disposed and fixed either above or, alternatively, underneath the cage floor. This embodiment enables the livestock owner to arrange the litter plate in a way that suits the needs of the animals and which accords with his convictions, and in particular to adapt the arrangement of the litter plate to the development of the animals inside the poultry cage, where necessary.

The inventive litter plate may be developed such that the abrasive surface section is disposed in the middle region of the litter plate. As a result of this arrangement, the litter plate is suitable in particular for the arrangement, explained above with reference to the poultry cage, on either side of an introducing device running through the poultry cage, in particular through the middle of the poultry cage.

It is still further preferred that the abrasive surface section is designed according to any one of the claims 3 to 8. With regard to these preferred embodiments of the abrasive surface section, reference is made to the descriptions provided in the foregoing regarding the poultry cage with a suitably designed abrasive portion.

The litter plate according to the invention can be produced according to a method which comprises the step of
  forming a supporting baseplate made of a polymer, in particular by injection molding or thermoforming,
and which is also characterized by the step of
  joining a plurality of abrasive grains to a surface section of the supporting baseplate.

The surface section and the abrasive grains can be joined by adhesive forces and/or by positive engagement. The join can basically be produced directly with the polymer from which the supporting baseplate is produced. As an alternative, however, the grains can also be joined by means of a binding material, for example an epoxy resin, which is applied to the supporting baseplate for this purpose, joined adhesively and/or by positive engagement to the supporting baseplate and which partially or completely encloses the grains.

The method can be developed by joining the abrasive grains to the surface section of the supporting baseplate in the step in which the supporting baseplate is formed. This embodiment makes it possible for the abrasive grains to be joined directly to the material of the supporting baseplate as early as the step in which the supporting baseplate is formed from the as yet uncured polymer (because it is not still warm or has not yet polymerized). This combines the two production functions of forming the supporting baseplate and joining the abrasive grains into a single production step, which can reduce production costs.

Figure 2:
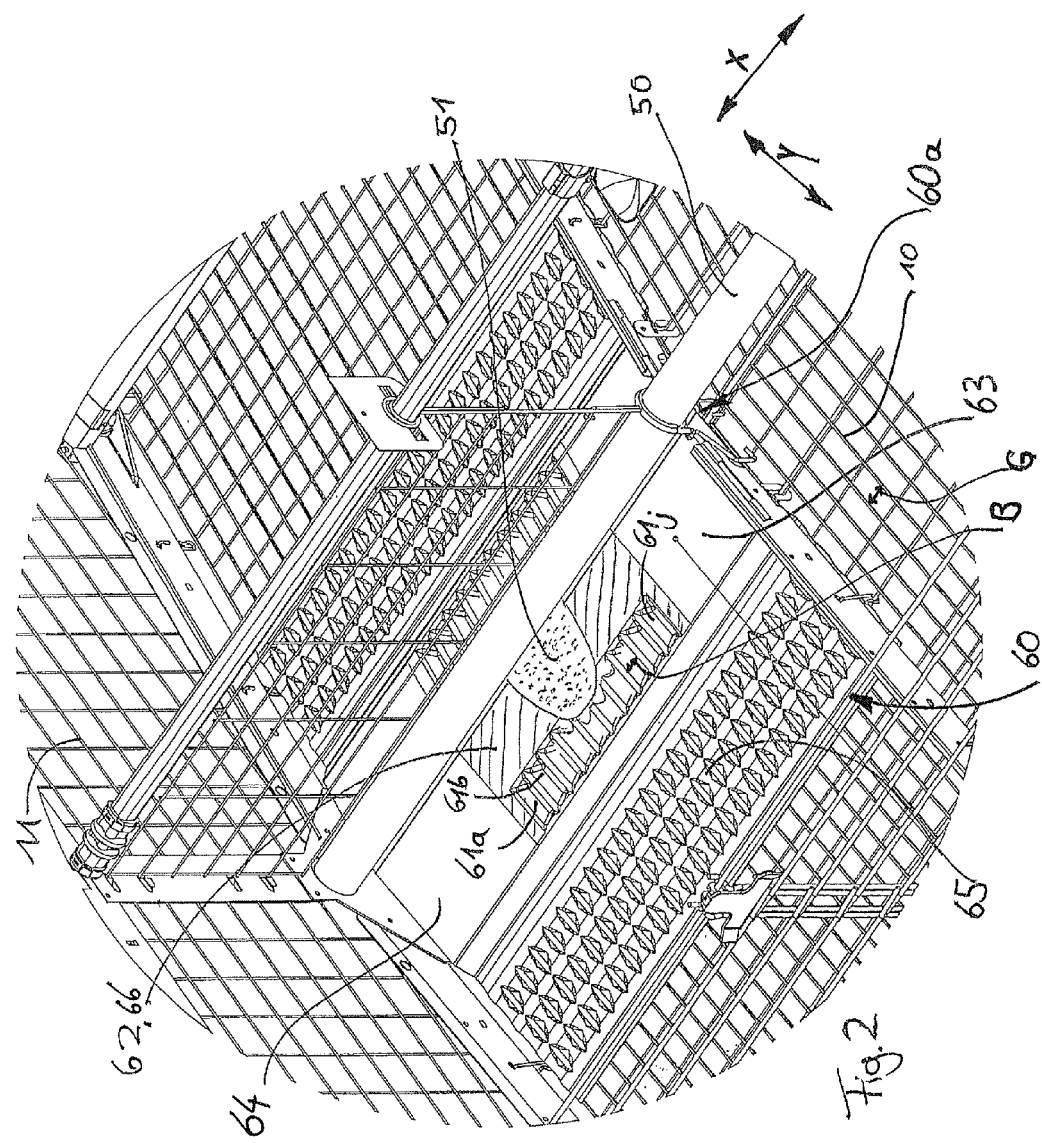
Figure 3:
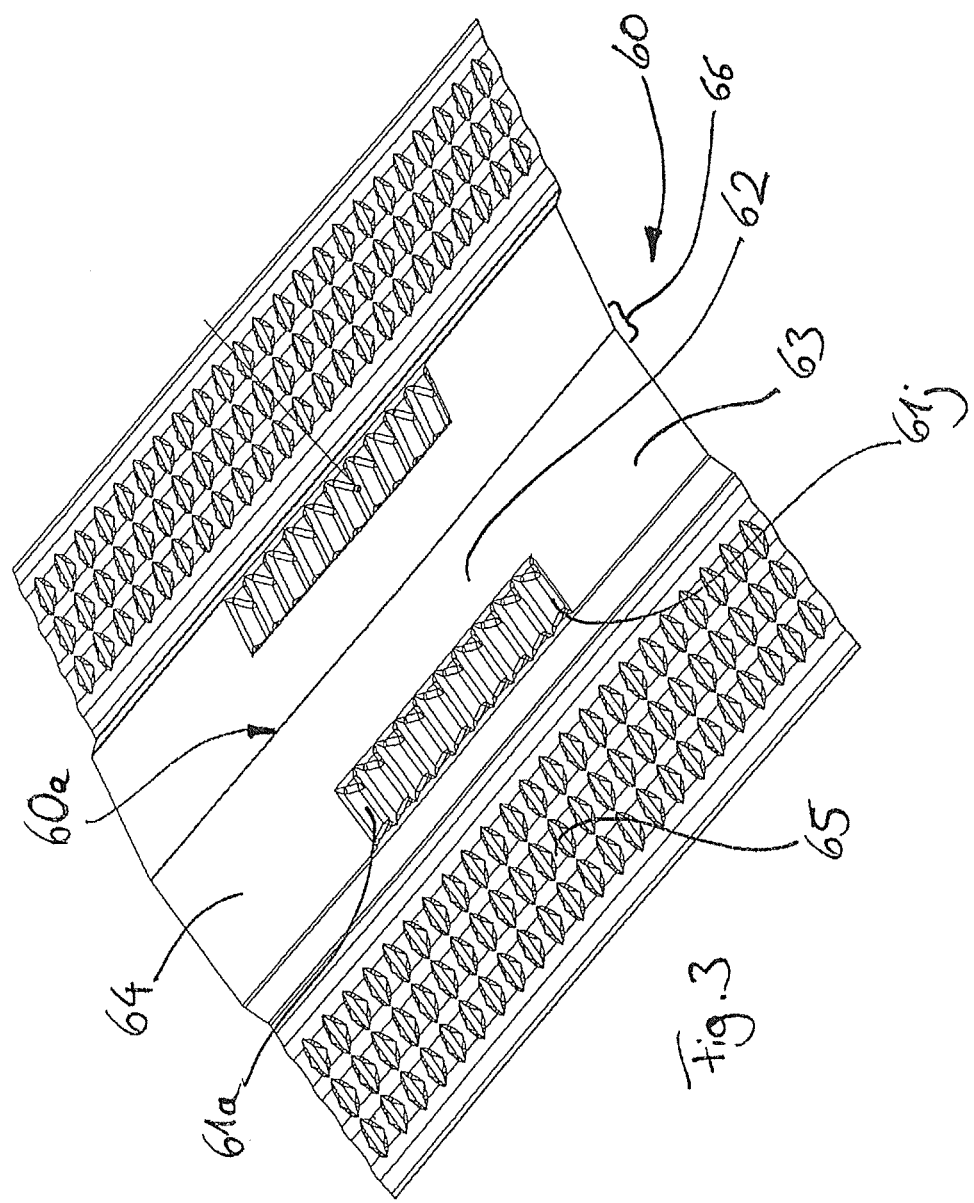

Some preferred embodiments of the invention shall now be described with reference to the attached Figures, in which FIG. 1 shows a perspective view, seen at an angle from above, of a poultry cage which meets the standards for an enriched cage according to European legislation and for keeping animals in groups according to German legislation, and which is designed in accordance with the invention, FIG. 2 shows a detailed perspective view of the scratching and picking zones of the embodiment shown in FIG. 1, seen at an angle from above, FIG. 3 shows a separate perspective view of a litter plate which is inserted into the poultry cage according to FIGS. 1 and 2, seen at an angle from above, FIG. 4 shows a side view of the end face of the litter plate shown in FIG. 3, and FIG. 5 shows a detailed view according to FIG. 2 of a second embodiment of the invention with a litter plate disposed underneath the cage floor.

As can basically be seen from FIG. 1, a poultry cage 1 has an area where animals are kept and which is bounded to the bottom and on all sides by a cage floor 10, end walls 11, 13 and side walls 12, 14. Such a poultry cage 1 is typically not provided with a separate cover on its upper side. Poultry cages of the construction shown here are typically stacked one above the other. A continuous, solid conveyor belt for the poultry droppings is disposed between the respective layers. This conveyor belt, or a housing around the conveyor belt, also functions as a top cover for the cage below it. End walls 11, 13 and side walls 12, 14 and the cage floor are all constructed from a cage grid structure and may comprise one or more parts.

Poultry cage 1 has a basically rectangular structure and extends further in longitudinal direction X, i.e., in the direction of side walls 12, 14, than in depth direction y, i.e., in the direction of end walls 11, 13. More particularly, the length of the poultry cage is approximately three times its depth.

An egg collection chute 20, 21 is disposed outside the poultry cage along side walls 12, 14 on either side of the poultry cage. The cage floor 10 of poultry cage 1 is inclined downward from the middle line in the direction of the side walls, so that eggs which are mislaid on the cage floor roll slowly in the Y-direction into egg collection chutes 20, 21 disposed outside side walls 12, 14, where they can be collected.

Above each egg collection chute 20, 21, a feeding trough 30, 31 extending as a trough in the X-direction along the entire length side walls is likewise disposed outside the poultry cage. The feed in said feeding trough 30, 31 can reach the laying hens in the cage through the openings in the grid of the side walls.

Poultry cage 1 also has a number of devices which foster species-appropriate husbandry. More particularly, these include four perches 40*a-d* which extend in the longitudinal direction of the cage over a section of the cage, two nest boxes 41*a, b* forming a region within the cage system that is darkened by side walls, which the laying hens can enter and leave through wall sections that flap back, and two scratching and picking zones 42*a, b*, in which the laying hens can scratch and pick in litter placed therein.

An introducing device 50 extends through the middle of poultry cage 1 in the longitudinal direction of the poultry cage, equidistant on both sides from side walls 12, 14. Introducing device 50 comprises a conveyor pipe which extends throughout from one end wall 11 to the other end wall 13 and which passes through the end walls in order to pass in the same manner through poultry cages adjacent to the respective ends. In the region of the scratching and picking zones 42*a, b*, a radial discharge opening is provided on the underside of the conveyor pipe of introducing device 50, through which litter material 51 can exit when a screw conveyor disposed inside the conveyor pipe is made to rotate.

As can be seen in greater detail from FIG. 2, a litter plate 60 is disposed above cage floor 10 in the scratching and picking zones. Litter plate 60 extends, from a region 66 underneath introducing device 50, on both sides in the Y-direction toward the side walls and is of symmetrical construction in relation to the vertical center plane defined by introducing device 50. Litter plate 60 shall now be described with reference to one side, whereby it should be understood that the other side of the litter plate is symmetrically configured in the same way.

In a middle zone relative to its longitudinal direction X, litter plate 60 has a plurality of pockets 61*a-j* which are disposed adjacent each other in a row in longitudinal direction X. These pockets are in the form of hollows in the litter plate and extend downward from the upwardly facing surface of the litter plate. Each pocket has a width (B) which is equal to the grid spacing (G) of the floor grid. This ensures that an egg which is laid in the region of the pockets or which rolls into the region of these pockets projects into the pocket only so far that it is neither fixed in its orientation by the side walls of the pocket running parallel to the end walls of the poultry cage nor held back by the lower or upper boundary of the pocket running parallel to the side walls of the poultry cage. In this embodiment, the pockets have an inner width, designed for hen's eggs, of 1.5 cm, as measured between the inner surfaces of the side walls.

Pockets 61*a-j* and a region 62 represented by hatching in FIG. 2 are provided with an abrasive surface. This abrasive surface is joined adhesively and partly by positive engagement to litter plate 60, which consists, for example, of polyethylene, by partial joining of corundum grains having a grain size of 80 µm to 600 µm, preferably 200 µm, by means of a binding material, for example epoxy resin.

A discharge opening (not visible) is disposed in the middle in relation to longitudinal direction X and within the center plane of the poultry cage as defined by introducing device 50, and on the underside of introducing device 50, from which discharge opening litter material 51 can exit as a cone when a screw conveyor disposed inside the conveyor pipe of introducing device 50 is made to rotate. Due to abrasive surface 62, said litter material 51 does not slide immediately down the inclined surface of litter plate 60 in the direction of the side walls, but forms a cone around the discharge opening that grows to a certain height and then reaches the discharge opening, surrounding it and closing it as a result. As soon as this closure has been achieved, no further material is conveyed out of the discharge opening by the screw conveyor. Instead, the litter material is conveyed inside the conveyor pipe of the introducing device into an adjacent poultry cage at the end, where it is again discharged from a similarly embodied discharge openings until the latter is likewise closed by the formation of a cone of material.

When the litter plate is deployed in practice, the litter material which is introduced in the form of the cone will subsequently distribute itself relatively quickly in the abrasive section 62 and pockets 61*a-j* due to the scratching and picking activity of the animals. Scratching in this litter has an abrasive effect on the claws of the animals, as a result of which the claws are kept to a species-appropriate length. Since the animals continue to pick in the litter, their beaks also come into contact with abrasive surface 62 and are reliably blunted on all sides there by the abrasive effect in pockets 61*a-j*, in such a way that they cannot cause any injury to the animals.

Sections 63, 64, which are not provided with an abrasive surface, are disposed in the longitudinal direction on either side of abrasive section 62. Another section 65 of the litter plate abuts these sections 62, 63, 64 in the Y-direction toward the side walls 12, 14 of the poultry cage. Section 65 is provided with a geometrically regular surface structure which consists of elongate hollows criss-crossing in the X- and Y-directions. The effect of this geometrical structuring of section 65 is firstly that litter material which is transported out of zone 62 or zones 63, 64 in the downwardly inclined direction of the litter plate in the direction of the side walls does not slip immediately from the litter plate, but is kept in these hollows on the litter plate. This structured surface 65 also increased the standing stability of the animals on the litter plate and also serves as a scratching and picking zone for the animals.

It should be understood as a basic principle that the proportion and the size of the abrasive portion of the litter plate can be adapted to the scratching and picking activity and to the growth of the claws and beaks of the animals, which are dependent on the respective species of poultry and their behavior, in order to wear down their claws and to blunt their beaks to a sufficient extent, but not excessively. To this end, abrasive section 62 may be reduced in size compared to the size shown in FIG. 2, for example by providing only pockets 61*a-j* with an abrasive surface. Abrasive section 62 may also be enlarged in size, for example by having it extend further in the X-direction of the lateral side edges, thus reducing the size of sections 63, 64, and/or by also providing section 65 partially or entirely with an abrasive surface.

As can be seen from FIG. 4, litter plate 60 is embodied in such a way that is inclines downward from a center plane 60*a* in the direction of the two side walls. Between sections 62-64 and section 65, a step 66 is disposed through which section 65 comes to rest underneath sections 62-64.

FIG. 5 shows an alternative embodiment of the invention. In this alternative embodiment, a litter plate 160 is disposed underneath cage floor 110 and stands in direct contact with, or in places is only slightly distanced from the grid bars which form cage floor 110.

In contrast to the litter plate 60 as previously described, litter plate 160 has neither pockets 61a-j nor a geometrical surface structure in a section 65. Instead, litter plate 160 is provided in a section 162, which extends over the entire length of the litter plate in the longitudinal direction, with an abrasive surface and in this region it achieved the desired claw wear and blunting of beaks as a result of the natural scratching and picking behavior of the animals. The litter plate is smooth in a section 165 which is situated further in the direction of the side walls and which abuts this abrasive section 162.

It should be understood that, depending on the required effect of claw shortening and beak blunting, the ratio of the abrasive section 162 to the smooth section 165 can be changed, and that the smooth section 165 may be left out entirely, if necessary, and replaced with a respective extension of the abrasive section 162.

In the embodiment shown in FIG. 5, the litter material drops out of a discharge opening in introducing device 150 in the same way as in the previously described embodiment shown in FIGS. 1-4. The litter material initially lands on a smooth deflection plate 152, which distributes the litter material on both side in the direction of the two side walls. For this purpose, deflection plate 152 is in the shape of a gable and has a downward inclination on both sides in the direction of the side walls.

From said deflection plate 152, the litter material proceeds to litter plate 160 in the region of abrasive section 162, where it remains lying. A cone can form in the same manner as previously described, which closes the discharge openings once it reaches a certain height and which causes the litter material in the introducing device to be conveyed further into an adjacent poultry cage at the end of the poultry cage.

The invention claimed is:

1. A poultry cage, comprising:
a cage floor, preferably having a grid structure,
end and side walls which extend upward from the cage floor and define all sides of an area where the animals are kept, an introducing device for introducing litter material, which is disposed above the cage floor and from which the litter material can be dispensed from at least one discharge opening, wherein at least one section of the device for introducing litter is disposed between the side walls, a litter plate connected to the cage floor, which has an upwardly facing floor standing area, comprising one section situated below the at least one discharge opening, and fixing means for fixing the litter plate to the cage floor,
wherein the floor standing area has at least one abrasive surface section, the roughness of which serves to shorten the claws of the poultry walking thereon and to blunt the beaks of the poultry picking thereon, characterized in that the litter plate comprises a plurality of litter pockets in the form of troughs.

2. The poultry cage according to claim 1, characterized in that the at least one abrasive surface section extends as far as a region situated below the at least one discharge opening.

3. The poultry cage according to claim 1, characterized in that the at least one abrasive surface section is formed by a plurality of abrasive grains which are partially or completely embedded in a binding material.

4. The poultry cage according to claim 1, characterized in that the litter plate is made of a polymer material in which, in the at least one surface section, a plurality of abrasive grains is partially or completely embedded directly in the polymer material or in a cured binding agent.

5. The poultry cage according to claim 1, characterized in that the litter plate extends on both sides, starting from the section situated below the at least one discharge opening, toward each of the two side walls and that the abrasive surface section is disposed in such a way that it is provided on both sides of the introducing device.

6. The poultry cage according to claim 1, characterized in that the litter plate is arranged at a slant in such a way that eggs laid thereon roll away from the litter plate in the direction of a side wall and that the surface structure is preferably designed in such a way that an egg laid on the litter plate is not held anywhere on the litter plate by a structure running transversely or at an angle in relation to the rolling direction toward the side wall.

7. The poultry cage according to claim 1, characterized in that the introducing device is a conveyor pipe with a rotating conveyor mechanism disposed therein, that the conveyor pipe runs from one end face to the other end face through the area where the animals are kept and has at least one radial opening for dispensing litter material.

8. The poultry cage according to claim 1, characterized in that the litter plate is disposed under the cage floor.

9. The poultry cage according to claim 1, wherein the troughs are designed as a row or as several parallel rows of adjacent troughs.

10. A poultry cage, comprising:
a cage floor, preferably having a grid structure,
end and side walls which extend upward from the cage floor and define all sides of an area where the animals are kept, an introducing device for introducing litter material, which is disposed above the cage floor and from which the litter material can be dispensed from at least one discharge opening, wherein at least one section of the device for introducing litter is disposed between the side walls, a litter plate connected to the cage floor, which has an upwardly facing floor standing area, comprising one section situated below the at least one discharge opening, and fixing means for fixing the litter plate to the cage floor,
wherein the floor standing area has at least one abrasive surface section, the roughness of which serves to shorten the claws of the poultry walking thereon and to blunt the beaks of the poultry picking thereon
wherein the at least one abrasive surface section of the floor standing area has a roughness within a first roughness range and the floor standing area has at least one second surface section having a roughness within a second roughness range and with a coarser surface structure than the first roughness range, characterized in that the at least one second surface section is formed by geometrical structuration of a plurality of hollows or bumps in the floor standing area of the litter plate.

11. The poultry cage according to claim 9, wherein the at least one second surface section is formed by a plurality of hollows or bumps in the floor standing area of the litter plate.

12. The poultry cage according to claim 10, wherein the at least one abrasive surface section extends as far as a region situated below the at least one discharge opening.

13. The poultry cage according to claim 10, wherein the at least one abrasive surface section is formed by a plurality of abrasive grains which are partially or completely embedded in a binding material.

14. The poultry cage according to claim 10, wherein the litter plate is made of a polymer material in which, in the at least one surface section, a plurality of abrasive grains is partially or completely embedded directly in the polymer material or in a cured binding agent.

15. The poultry cage according to claim 10, wherein the litter plate extends on both sides, starting from the section situated below the at least one discharge opening, toward each of the two side walls and that the abrasive surface section is disposed in such a way that it is provided on both sides of the introducing device.

16. The poultry cage according to claim 10, wherein the litter plate is arranged at a slant in such a way that eggs laid thereon roll away from the litter plate in the direction of a side wall and that the surface structure is preferably designed in such a way that an egg laid on the litter plate is not held anywhere on the litter plate by a structure running transversely or at an angle in relation to the rolling direction toward the side wall.

17. The poultry cage according to claim 10, wherein the introducing device is a conveyor pipe with a rotating conveyor mechanism disposed therein, that the conveyor pipe runs from one end face to the other end face through the area where the animals are kept and has at least one radial opening for dispensing litter material.

18. The poultry cage according to claim 10, wherein the litter plate is disposed under the cage floor.

* * * * *

UNITED STATES PATENT AND TRADEMARK OFFICE
CERTIFICATE OF CORRECTION

PATENT NO.        : 8,910,594 B2                                  Page 1 of 1
APPLICATION NO.   : 13/518786
DATED             : December 16, 2014
INVENTOR(S)       : Küking It is certified that error appears in the above-identified patent and that said Letters Patent is hereby corrected as shown below:

In the Claims

Col. 12, claim 11, line 51

"claim 9" should be --claim 10--

Signed and Sealed this
Twelfth Day of May, 2015

Michelle K. Lee
*Director of the United States Patent and Trademark Office*